(12) United States Patent
Cattaneo (10) Patent No.: US 11,054,061 B2
(45) Date of Patent: Jul. 6, 2021

(54) CABLE TUBE FOR FURNITURE

(71) Applicant: Leonardo S.r.l., Figino Serenza (IT)

(72) Inventor: Carlo Cattaneo, Figino Serenza (IT)

(73) Assignee: Leonardo S.r.l., Figino Serenza (IT)

( * ) Notice: Subject to any disclaimer, the term of this patent is extended or adjusted under 35 U.S.C. 154(b) by 6 days.

(21) Appl. No.: 16/479,930

(22) PCT Filed: Feb. 14, 2018

(86) PCT No.: PCT/EP2018/053645
§ 371 (c)(1),
(2) Date: Jul. 23, 2019

(87) PCT Pub. No.: WO2018/149860
PCT Pub. Date: Aug. 23, 2018

(65) Prior Publication Data
US 2019/0376621 A1    Dec. 12, 2019

(30) Foreign Application Priority Data

Feb. 20, 2017 (IT) ........................ 202017000018680

(51) Int. Cl.
| | |
|---|---|
| *F16L 3/015* | (2006.01) |
| *A47B 21/06* | (2006.01) |
| *H02G 3/04* | (2006.01) |
| *A47B 97/00* | (2006.01) |

(52) U.S. Cl.
CPC .............. *F16L 3/015* (2013.01); *A47B 21/06* (2013.01); *H02G 3/0475* (2013.01); *A47B 2097/003* (2013.01)

(58) Field of Classification Search
CPC ..... F16L 3/015; A47B 21/06; A47B 2097/003
USPC ................................ 138/121, 122, 119, 118
See application file for complete search history.

(56) References Cited

U.S. PATENT DOCUMENTS

| | | | | |
|---|---|---|---|---|
| 4,130,904 A | * | 12/1978 | Whalen ..................... | A61F 2/06 |
| | | | | 138/122 |
| 3,043,174 A | | 7/1982 | Schauenburg | |
| 5,482,089 A | * | 1/1996 | Weber ................. | F01N 13/1816 |
| | | | | 138/103 |
| 2003/0020381 A1 | | 1/2003 | Cattaneo | |
| 2003/0098084 A1 | * | 5/2003 | Ragner .................. | F16L 11/118 |
| | | | | 138/129 |
| 2009/0050227 A1 | * | 2/2009 | Smith ..................... | A47L 9/248 |
| | | | | 138/118 |

FOREIGN PATENT DOCUMENTS

JP   2000-116444   4/2000

OTHER PUBLICATIONS

International Search Report and the Written Opinion dated May 3, 2018 From the International Searching Authority Re. Application No. PCT/EP2018/053645. (12 Pages).

(Continued)

*Primary Examiner* — Patrick F Brinson (57) ABSTRACT

The present invention relates to a cable tube (10) for furniture (18). The cable tube is composed of the combination of a foldable and extensible helical cylindrical spring (11), whose coils (13) are applied and constrained to a sleeve (12) made of flexible material, said tube (10) being provided at opposite ends with a ballasted base (15) for resting on the floor, and connection means (17) to said furniture (18).

7 Claims, 11 Drawing Sheets

(56) References Cited

OTHER PUBLICATIONS

Amazon "Schlauch Abluft, mit Adapter, 3m, PVC [Schlauch PVC Ducting, With Adapter, 3m]", Amazon.de: Baumarkt, XP055468135, 3 P., Jul. 13, 2013.
Amazon "Umlenkstück mit Flexiblem Schlauch und Zwei Schlauchschellen in Weiß L 1000 mm für 125er Abluftsystem mit Rechteckanschluss und Rundanschluss für Flachkanal / Vierkantrohr Abluft [Diverter Set With Flexible Hose and Two Hose Clamps White Length 1000 mm for 125 Exhaust System Square Connector With Rundanschluss Latch for Flat Channel / Square Tube Extractor]", Amazon.de: Küche und Haushalt, XP055468129, 3 P., Nov. 7, 2013.

* cited by examiner

CABLE TUBE FOR FURNITURE

RELATED APPLICATIONS

This application is a National Phase of PCT Patent Application No. PCT/EP2018/053645 having International filing date of Feb. 14, 2018, which claims the benefit of priority of Italian Patent Application No. 202017000018680 filed on Feb. 20, 2017. The contents of the above applications are all incorporated by reference as if fully set forth herein in their entirety.

FIELD AND BACKGROUND OF THE INVENTION

The present invention relates to an improved cable tube for furniture, in particular but not exclusively for desks, tables, shelves, workstations and the like.

SUMMARY OF THE INVENTION

The general objective of the present invention is to provide a cable tube, in particular but not exclusively for workstations, which is easy to produce and apply to furniture, allowing an easy passage and positioning of cables from the floor, from which the same cables exit, to the work surface which is above the floor at a certain distance from the same.

A further objective of the invention is to provide a cable tube which does not need to be constrained to the floor, and which can be easily applied and dismounted with respect to the furniture, for example a workstation.

Another objective of the invention is to provide a cable tube which can be re-used fully intact in the case of a change in position of the furniture.

Yet another objective of the invention is to provide a cable tube which is able to provide the cables with adequate protection from the surrounding external environment.

These objectives are achieved by a cable tube for furniture composed of the combination of a foldable helical cylindrical spring and a sleeve or mantle of flexible material to which the coils of said spring are firmly applied. Said spring can be extended between any two positions, a first shortened non-operative position in which said coils are arranged gathered against each other, and a second extended operating position in which said coils are spaced from each other.

At one end of said tube, a base having a suitable weight (ballasted) is provided, which can be freely rested on the floor, having at least one radial inlet opening for the cables, whereas the opposite end is provided with rapid attachment means to a piece of furniture.

BRIEF DESCRIPTION OF THE SEVERAL VIEWS OF THE DRAWINGS

The structural and functional characteristics of the invention, and its advantages with respect to the known art, will appear clearly evident from the following description, referring to the enclosed drawings, which illustrate a non-limiting embodiment example of the invention itself.

In the drawings:

FIGS. 1, 2, 3 and 4 are perspective views illustrating the cable tube according to the invention in various exemplary positions, wherein FIGS. 1, 2 and 3 are possible extended operating positions, whereas FIG. 4 is the withdrawn non-operating position;

DESCRIPTION OF SPECIFIC EMBODIMENTS OF THE INVENTION

With reference to the attached drawings and photographs, the cable tube according to the present invention is indicated as a whole with 10 and is structurally composed of the combination of a helical cylindrical spring 11 applied and constrained to a sleeve 12 made of a flexible material, for example an extruded plastic material.

Said spring 11 can, for example, be made of metal wire and can be folded with respect to the longitudinal symmetry axis X of the tube.

Figure 1:
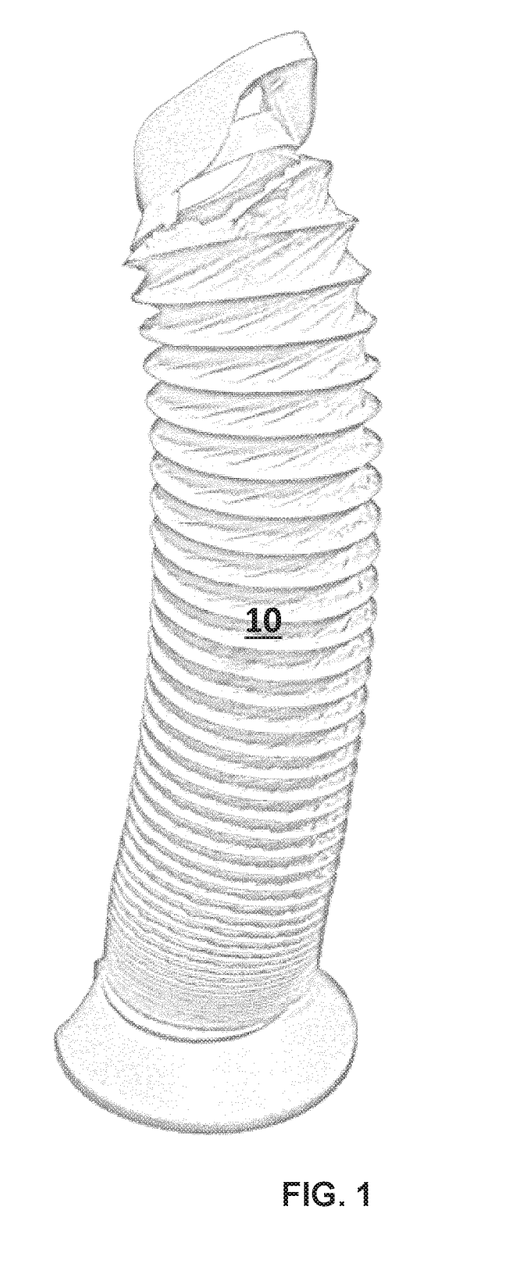
Figure 2:
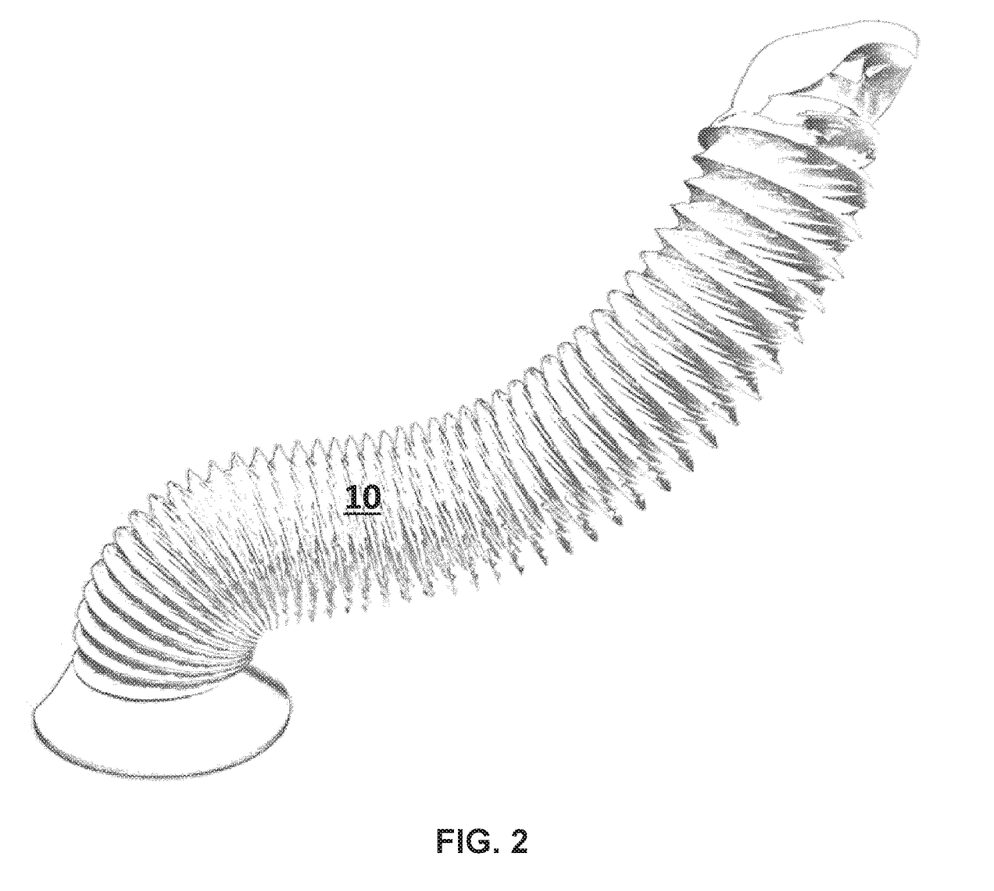
Figure 3:
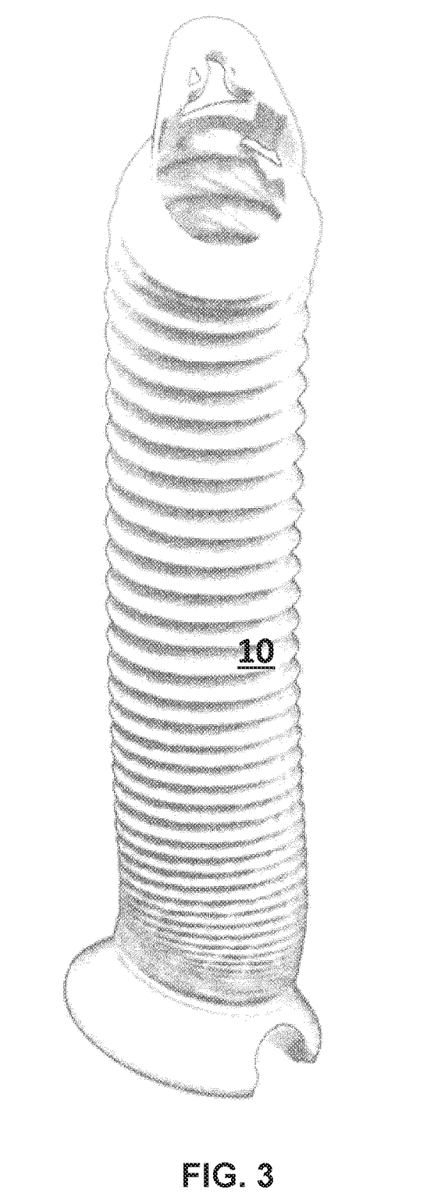
Figure 4:
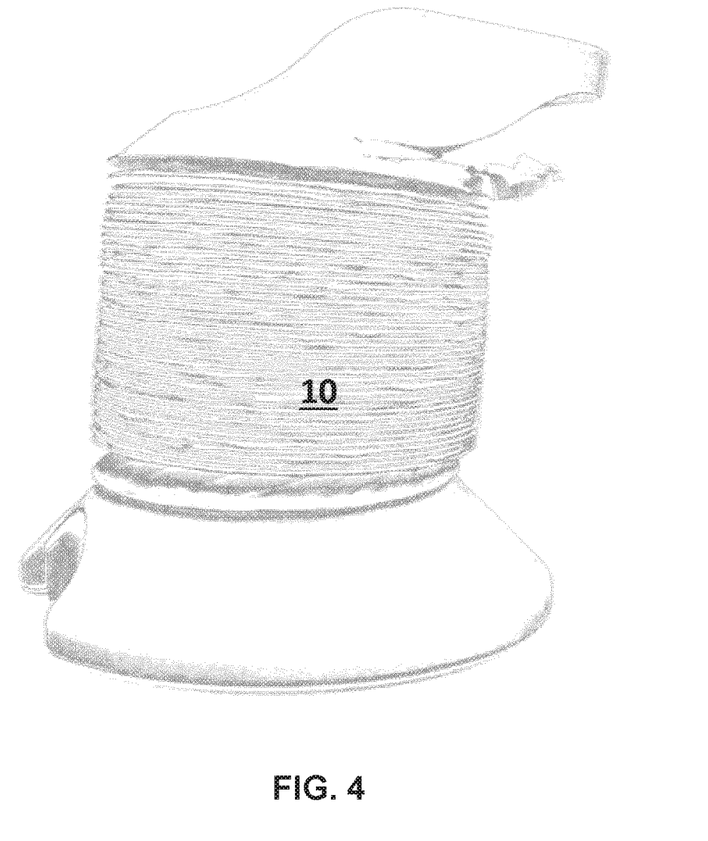
Figure 5:
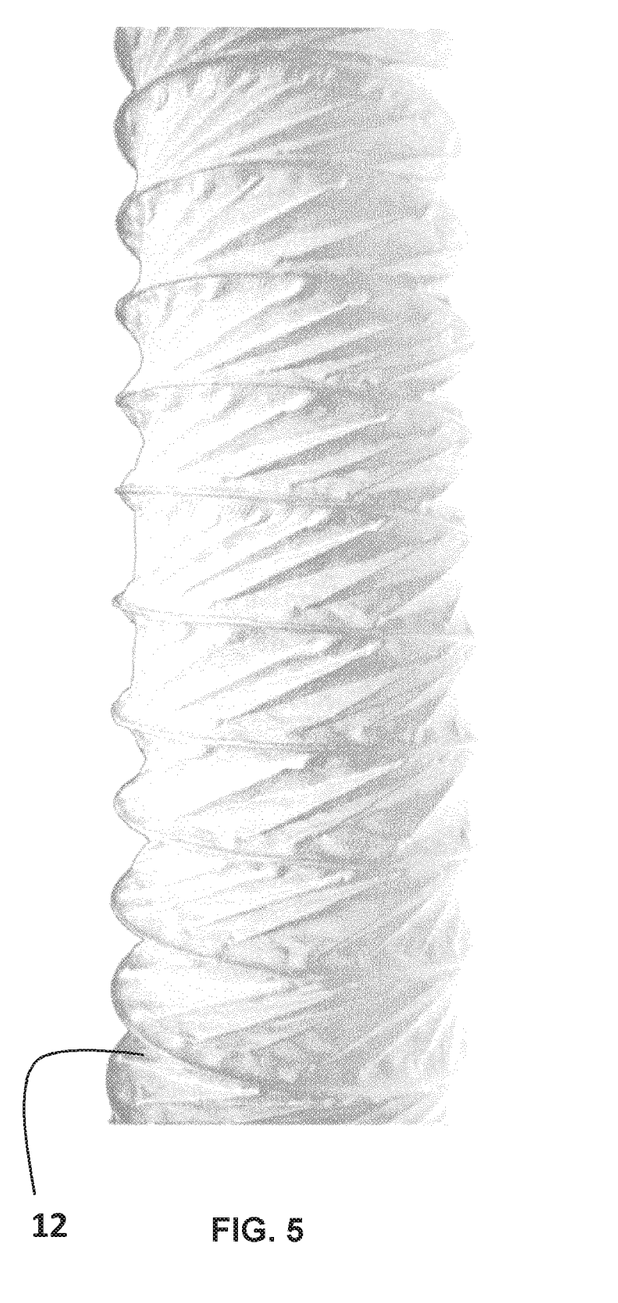
FIG. 5 is an enlarged view of a section of the cable tube.
Figure 6:
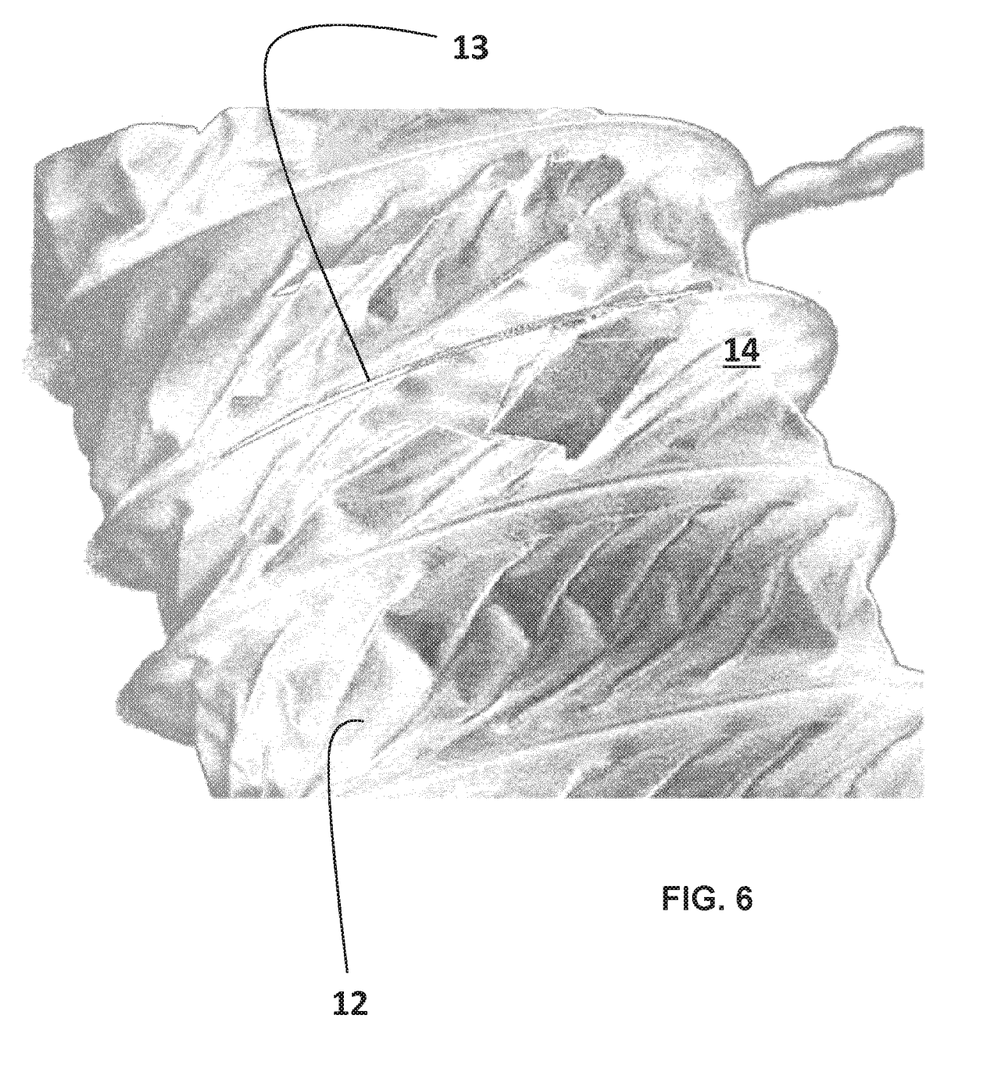
FIG. 6 is an enlarged split detail showing the the metal-wire spring/plastic sleeve coupling.
Figure 7:
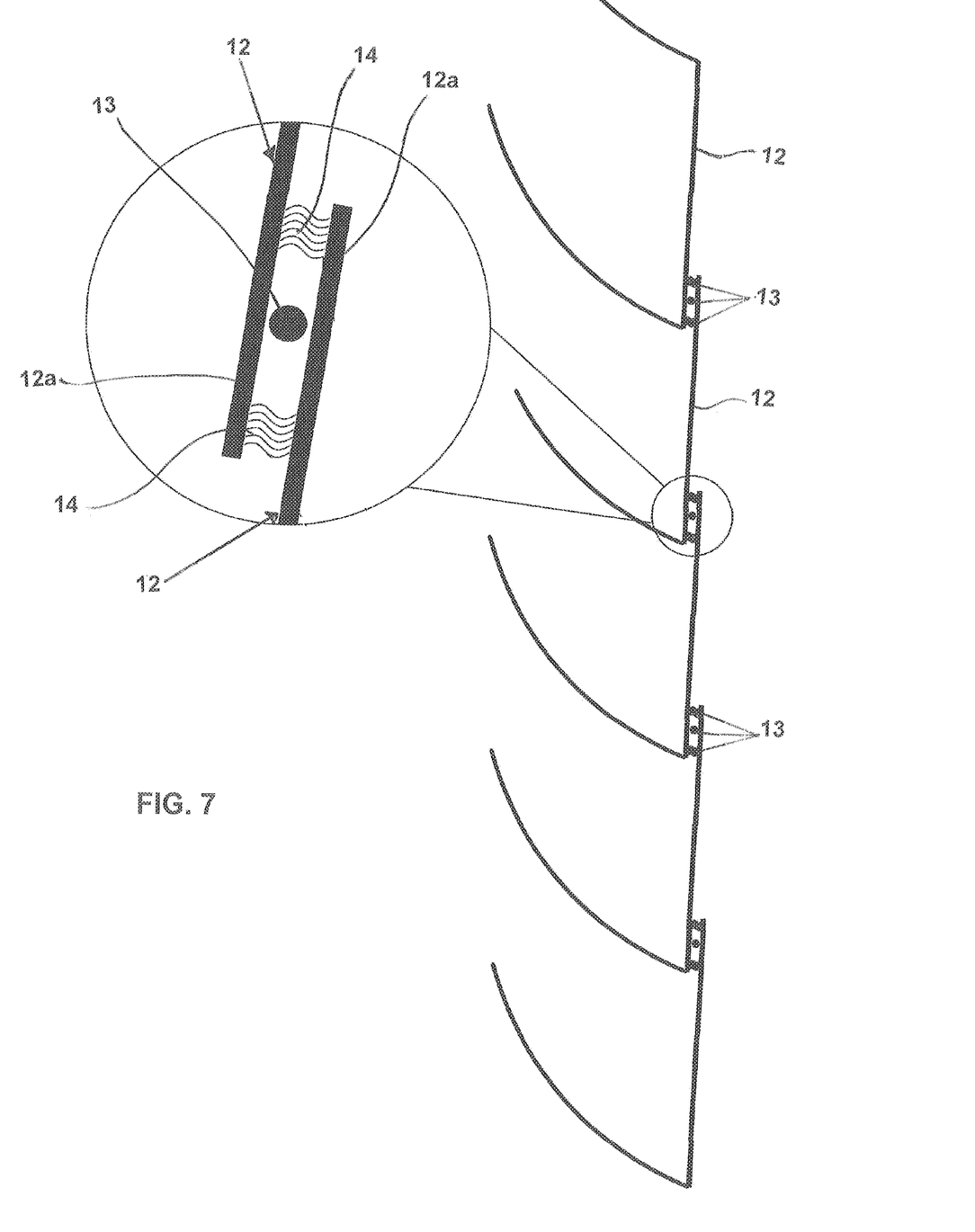
FIG. 7 is an enlarged detail illustrating a possible non-binding exemplary coupling system between the metal coils of the spring and the plastic sleeve.

As can be clearly seen from the details of FIGS. 6 and 7 of the drawings, the coils 13 of the spring 11 are applied to said sleeve 12, and constrained to it by means of weldings 14.

As can be clearly seen from the details of FIG. 7, the sleeve or mantle 12 can be composed, for example, of strips of plastic material 12a wound on the coils 13 of metal wire of the spring, said coils 13 thus being contained between two partial ty overlapping strips 12a and two subsequent weldings which constrain the strips 12a.

Figure 8:
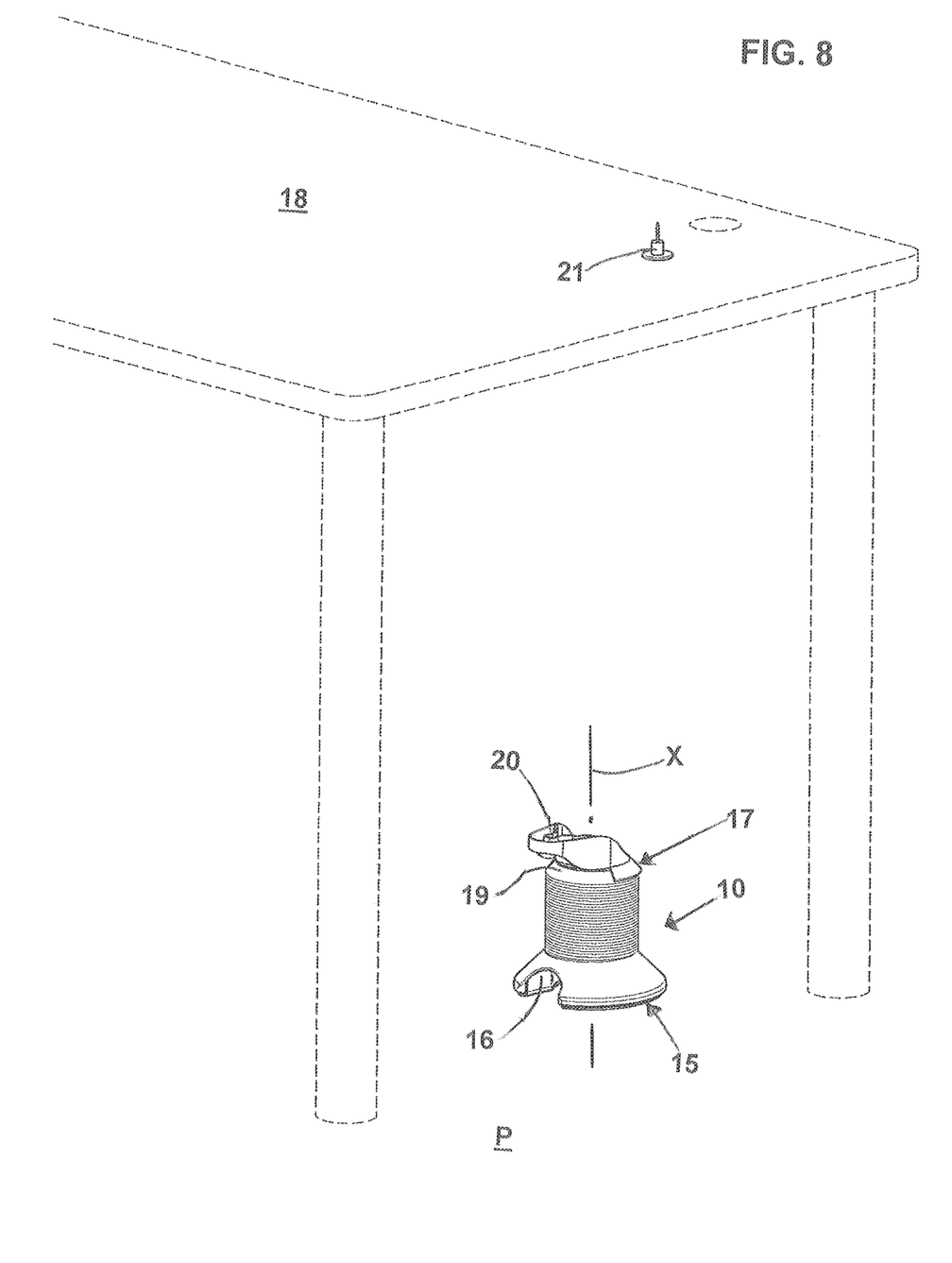
FIG. 8 is a perspective view illustrating the cable tube of the previous figures positioned beneath a table, in a withdrawn non-operating position.
Figure 9:
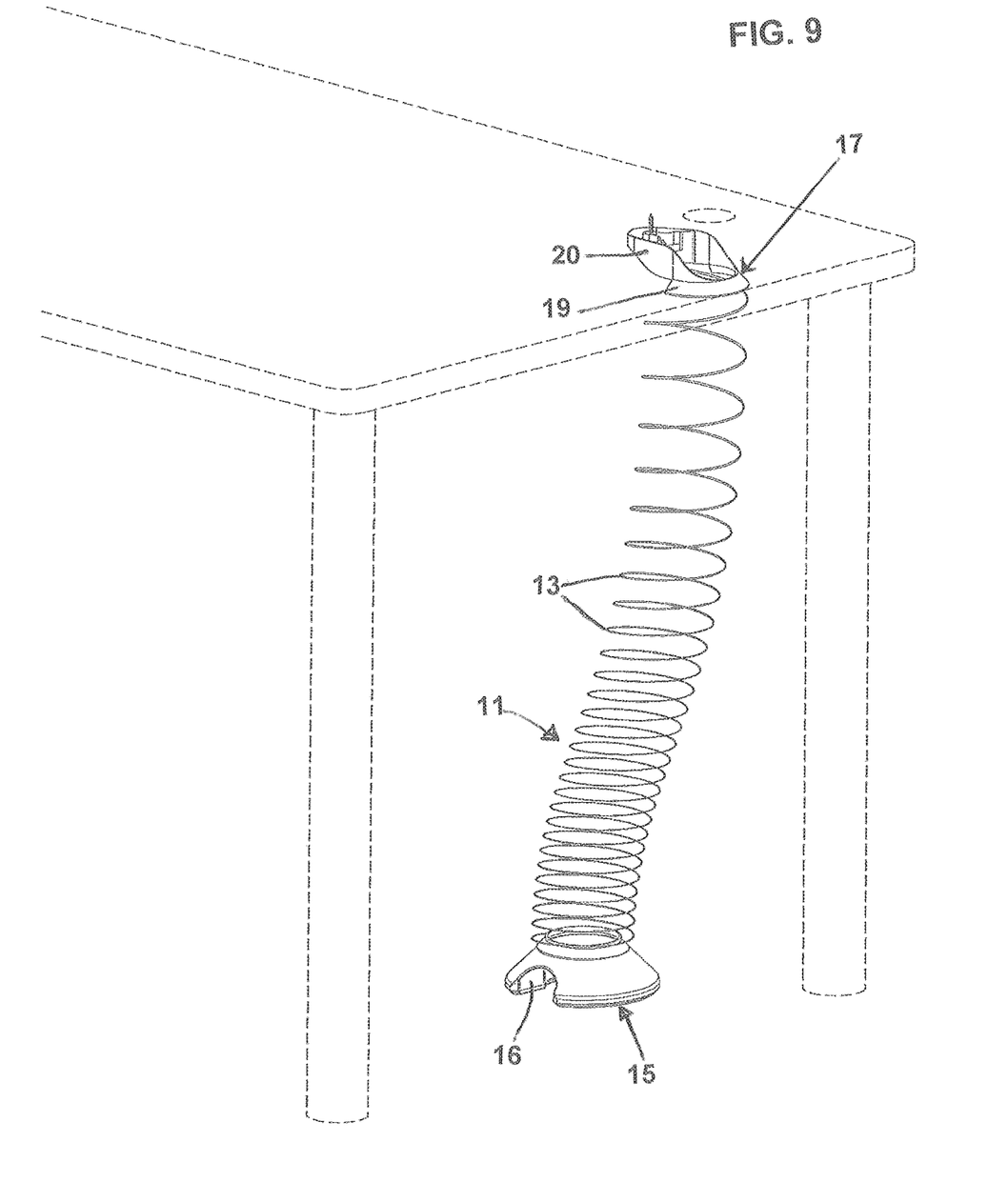
FIG. 9 is a perspective view of the cable tube of FIG. 8 in the extended operating position, without the outer sleeve, with the external helical spring of metal wire in sight.
Figure 10:
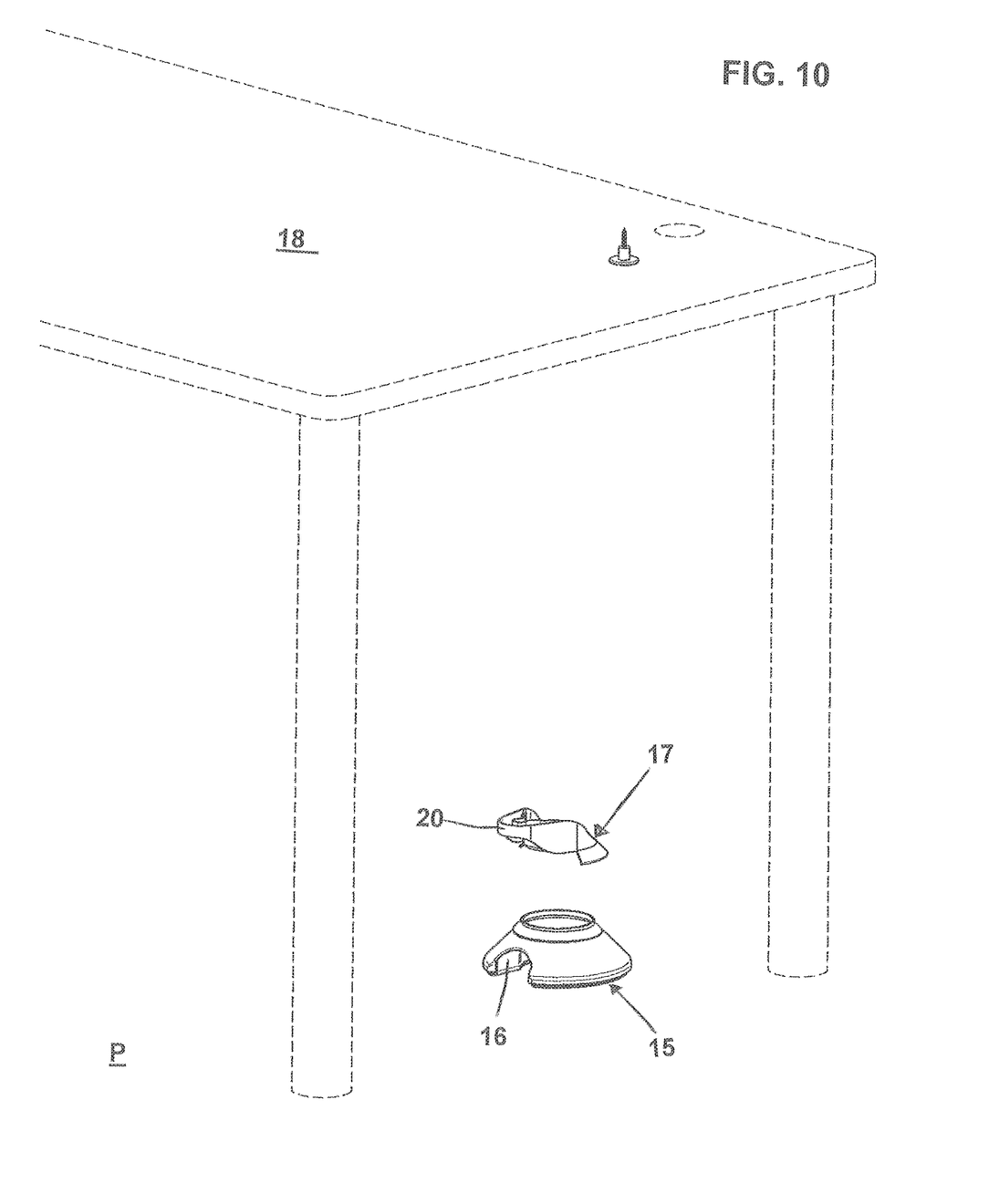
FIGS. 10 and 11 are perspective views illustrating the lower ballasted base and the upper connection to the worktop of the cable tube.
Figure 11:
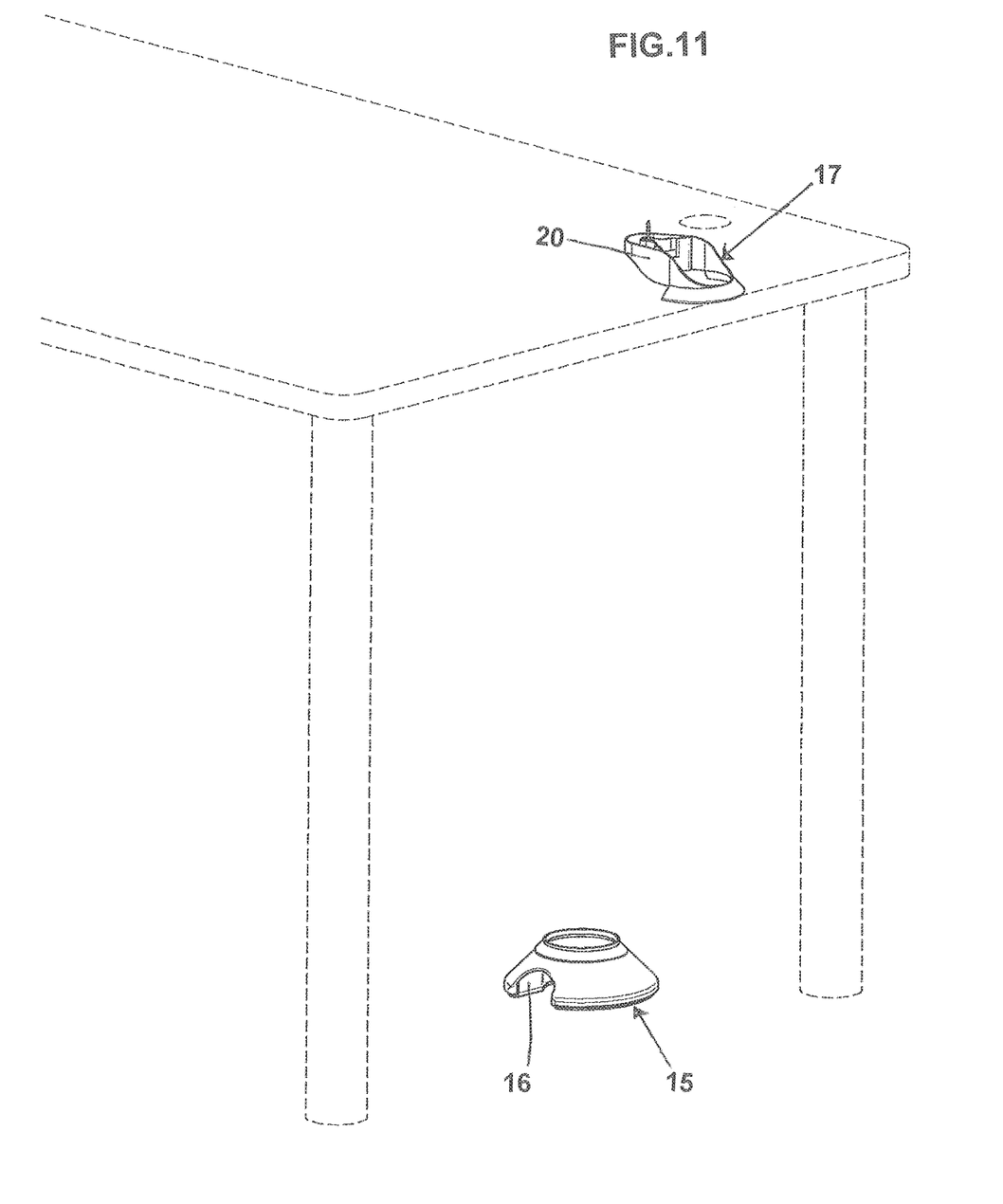

Thanks to the characteristics of foldability and flexibility of the spring 11 and sleeve 12, respectively, and the compressibility of the same spring 11, the tube 10 can be extended between different positions: a shortened non-operating position (FIG. 8), and a plurality of various extended operating positions (FIGS. 1-4). In the shortened position, the coils of the spring 11 are arranged gathered against each other, whereas in the various extended positions, the same coils 13 are spaced from each other. It is evident how the tube 10 can acquire various sinuous positions in space, as clearly shown in the figures.

Characteristically, the lower free end of the tube is provided with a ballasted base 15 (having an adequate weight) which can be freely rested on the floor P in different positions, the most appropriate and desired.

Said base 15 has a generally annular configuration and is provided with at least one radial opening 16 for the passage of cables (not shown), which is in direct communication with the inside of the tube 10.

The upper free end of the tube 10, on the other hand, is provided with rapid connection means 17 to a piece of furniture, for example a table 18, desk or the like.

Said connection means 17 can be composed, for example, of a ring 19 provided with a rapid snap-on coupling 20, that can be freely and removably engaged on a pin 21 of the desk 18.

From what is described above with reference to the figures, it is evident how the cable tube according to the invention can be advantageously used in the most varied operating positions, depending on the point of exit of the cables from the floor and the point of arrival of the same on the work surface.

The cables are also hidden from sight, protected from the external environment, and the cable tube also has a pleasant appearance.

The objectives mentioned in the preamble of the description have therefore been achieved.

The scope of the invention is defined by the following claims.

What is claimed is:

1. A cable tube (10) for furniture (18) wherein it is composed of the combination of a foldable and extensible helical cylindrical spring (11) whose coils (13) are applied and constrained to a sleeve (12) made of flexible material, said tube (10) being provided at opposite ends with a ballasted base (15) for resting on the floor, and connection means (17) to said furniture (18);

wherein said sleeve (12) is composed of strips (12a) of plastic material wound on the coils (13) of the spring, said coils (13) thus being contained between two partially overlapping strips (12a) and two subsequent weldings (14) which constrain the strips (12a).

2. The cable tube (10) according to claim 1, characterized in that said ballasted base (15) has a generally annular configuration with at least one radial opening (16) for the passage of cables.

3. The cable tube (10) according to claim 1, wherein said connection means (17) to the furniture consist of a ring (19) provided with a rapid snap-on coupling (20) on a pin (21) of the furniture itself.

4. The cable tube (10) according to claim 1, wherein it can be extended (extensible) between a withdrawn non-operating position in which said coils (13) are gathered one above the other, and different extended operating positions in which the coils (13) are spaced from each other.

5. The cable tube (10) according to claim 2, wherein said sleeve (12) is composed of strips (12a) of plastic material wound on the coils (13) of the spring, said coils (13) thus being contained between two partially overlapping strips (12a) and two subsequent weldings (14) which constrain the strips (12a).

6. The cable tube (10) according to claim 3, wherein said sleeve (12) is composed of strips (12a) of plastic material wound on the coils (13) of the spring, said coils (13) thus being contained between two partially overlapping strips (12a) and two subsequent weldings (14) which constrain the strips (12a).

7. The cable tube (10) according to claim 4, wherein said sleeve (12) is composed of strips (12a) of plastic material wound on the coils (13) of the spring, said coils (13) thus being contained between two partially overlapping strips (12a) and two subsequent weldings (14) which constrain the strips (12a).

* * * * *